(12) United States Patent
Babatunde

(10) Patent No.: US 10,818,068 B2
(45) Date of Patent: Oct. 27, 2020

(54) VIRTUAL HYBRID TEXTURE MAPPING

(71) Applicant: VMware, Inc., Palo Alto, CA (US)

(72) Inventor: Rasheed Babatunde, Flower Mound, TX (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 15/145,607

(22) Filed: May 3, 2016

(65) Prior Publication Data
US 2017/0323470 A1 Nov. 9, 2017

(51) Int. Cl.
G06T 15/04 (2011.01)
G06T 1/20 (2006.01)
A63F 13/35 (2014.01)
A63F 13/25 (2014.01)

(52) U.S. Cl.
CPC .............. *G06T 15/04* (2013.01); *A63F 13/25* (2014.09); *A63F 13/35* (2014.09); *G06T 1/20* (2013.01)

(58) Field of Classification Search
CPC . G06T 15/04; G06T 1/20; A63F 13/25; A63F 13/35
See application file for complete search history.

(56) References Cited

U.S. PATENT DOCUMENTS

| 6,348,919 B1* | 2/2002 | Murphy | G06T 15/005 345/421 |
|---|---|---|---|
| 2013/0147819 A1* | 6/2013 | Dharmapurikar | G06T 9/00 345/522 |
| 2013/0268583 A1* | 10/2013 | Sheppard | H04L 29/06047 709/203 |
| 2015/0130789 A1* | 5/2015 | Heinz, II | G06T 11/001 345/419 |
| 2015/0130813 A1* | 5/2015 | Taraki | G06T 1/20 345/441 |
| 2015/0343306 A1 | 12/2015 | Bentdahl | |
| 2016/0059125 A1* | 3/2016 | Georgiev | A63F 13/216 463/31 |
| 2016/0191960 A1* | 6/2016 | Hoeben | H04N 21/8455 725/41 |
| 2016/0210722 A1* | 7/2016 | Fortin | G06T 15/005 |
| 2016/0330493 A1* | 11/2016 | Chuah | G06T 15/04 |
| 2017/0024924 A1* | 1/2017 | Wald | G06T 1/60 |
| 2017/0140570 A1* | 5/2017 | Leibel | A63F 13/20 |

* cited by examiner

*Primary Examiner* — Barry Drennan
*Assistant Examiner* — Khoa Vu
(74) *Attorney, Agent, or Firm* — Loza & Loza, LLP

(57) ABSTRACT

A gaming device is configured to provide virtual hybrid texture mapping, which provides a type of virtual placeholder that can be filled in using cloud computing resources. The virtual placeholders are filled in to create more detailed textures whose calculated are offloaded to a cloud computing service provider data center's cluster.

17 Claims, 2 Drawing Sheets

VIRTUAL HYBRID TEXTURE MAPPING

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, tablet computers, portable game devices, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send commands to the GPU to implement a particular graphics processing task, e.g. render a particular texture that has changed with respect to a previous frame in an image. These draw commands may be coordinated by the CPU with a graphics application interface (API) in order to issue graphics rendering commands that correspond to the state of the particular application's virtual environment. In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels (or fragments) before outputting the rendered image on a display.

However, rendering photorealistic or high-quality graphics require large amount of computing power and the peak capabilities are often limited to a current generation of hardware. This issue is elevated in gaming consoles, which are generally not upgradeable, and are locked into a certain level of graphics-rendering capabilities with each generation.

SUMMARY

One or more embodiments of the present disclosure provide a method for rendering computer graphics. The method includes allocating graphical resources comprised of local computing resources of a first device and external cloud computing resources. The graphical resources are configured to render a graphical image. The method further includes rendering a first portion of the graphical image using the local computing resources, rendering a texture mapping of the graphical image using the external cloud computing resources, and modifying the first portion of the graphical image based on the texture mapping rendered by the external cloud computing resources to increase details in the graphical image. The method includes displaying the graphical image using the first device.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
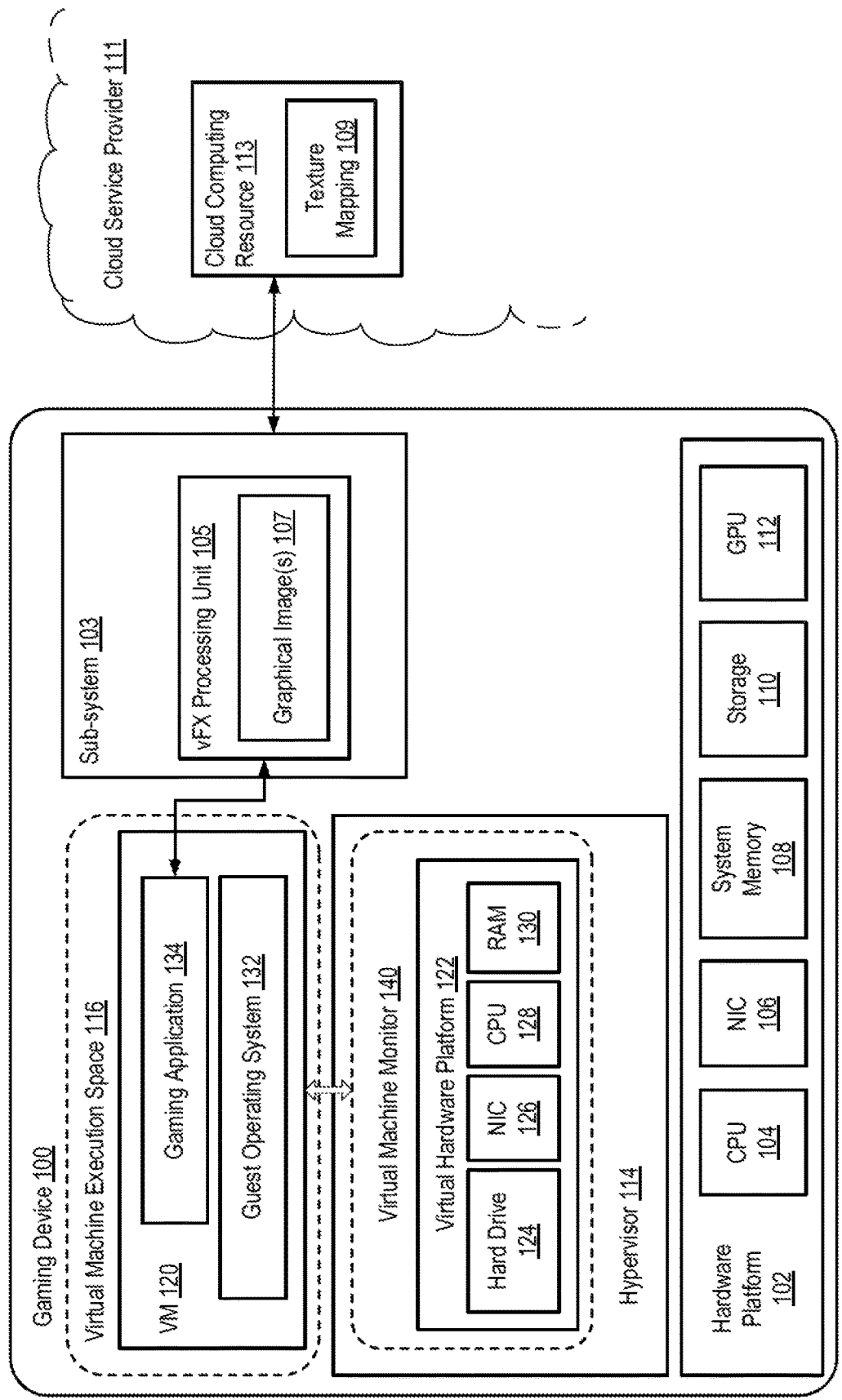
FIG. 1 depicts a block diagram of a virtualized computer system in which one or more embodiments of the invention may be practiced.

Embodiments of the present disclosure address the problem of the limitations placed on an application by the static nature of certain hardware devices in which the application resides, due to cost limitations or by design. For example, gaming consoles have a static set of hardware resources and are typically not upgradeable, i.e., computing resources cannot be switched out for upgraded parts. Embodiments of the present disclosure create a bridge between local gaming and cloud gaming using hybrid cloud computing approaches.

Using a form of 3D texture mapping, the described embodiments provide a type of "open variables" that can be filled in using cloud computing resources. In one embodiment, these variable placeholders may not be visible to the user, and by enabling virtual enhancement features, the variable placeholders are filled in to create more detailed textures whose calculated are offloaded to a data center's computing cluster. Once these calculations have been processed, a high speed network connection (i.e., broadband) allow a gaming console to download the processed data in real-time to enhance the 3D textures on screen as the game is being played. In some embodiments, the gaming console may use memory and storage resources (e.g., SSD) to allow the textures to be held locally to help prevent lag time while playing the game. This would increase the life of the console device and allow elastic computing upgradeability for processing game graphics and textures. It is noted that the gaming console may still have its local computing resources which are allowed the game to be played although the local resources wouldn't only provide graphics that are typical of its current hardware configuration.

With the ability to both locally and externally process graphics, embodiments of the present disclosure remove the disk of losing data that would drastically affect gameplay. For example, if the game is being "virtually enhanced" and a network connection is lost, the storage resource would provide redundancy. If data residing on storage is no longer usable or not sufficient, the gaming application can simply continue with the local hardware computing resources without abruptly stopping gameplay. That is, the graphics generated would instead be downgraded until the connection is re-established with the corresponding cloud data center.

One benefit of this technology is the elastic nature of the compute used to render the graphics. In this scenario, the console would be able to run extremely graphics intensive games by simply rendering the default maximum allowed for its current graphics hardware and relying on cloud compute to render the superimposed enhancements. If, for some reason, the connection to the database is terminated or lagging behind, the system would simply failback to its default after using its reserved storage resources if available. This type of technology could also be used to revive older games with the upgrading of data center compute and texture maps.

Figure 2:
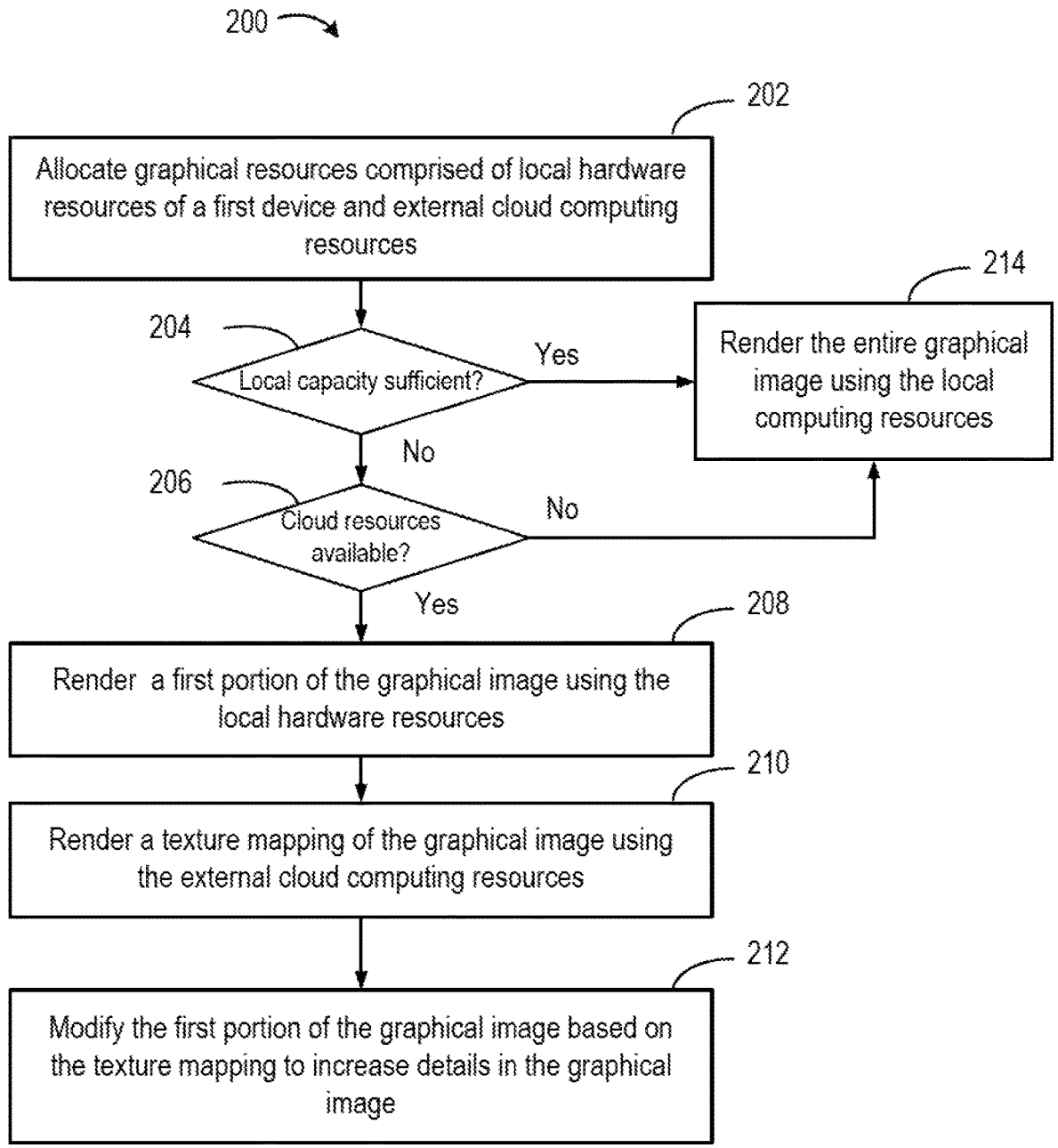
FIG. 2 is a flow diagram depicting a method for rendering computer graphics, according to one embodiment of the present disclosure.

FIG. 1 depicts a block diagram of a virtualized computer system in which one or more embodiments of the invention may be practiced. The virtualized computer system is a gaming device 100 that may be constructed on a desktop, laptop or server grade hardware platform 102 such as an x86 architecture platform. The hardware platform includes one or more CPUs 104, a network adapter (NIC 106), system memory 108, storage 110, a graphics processing unit (GPU), and other I/O devices such as, for example and without limitation, mouse, keyboard, gamepad, display output (not shown in FIG. 1). Storage 110 represents one or more local storage devices (e.g., one or more hard disks, flash memory modules, solid state disks, and optical disks) and/or a storage interface that enables gaming device 100 to communicate with one or more network data storage systems. GPU 112 is a specialized electronic circuit configured to generate graphical images, e.g., in a frame buffer intended for output to a display A virtualization software layer, also referred to hereinafter as hypervisor 114, is installed on top of hardware platform 102. Hypervisor 114 supports virtual machine execution space 116 within which multiple VM processes may be concurrently executed to instantiate a VM 120. While a single VM 120 is depicted in FIG. 2, it is understood that hypervisor 114 may support multiple VMs 120 concurrently. For each of VMs 120, hypervisor 114 manages a corresponding virtual hardware platform 122 that includes emulated hardware such as virtual hard drive 124, virtual NIC 126, virtual CPU 128 and guest physical RAM 130 for VM 120. For example, virtual hardware platform $122_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 132 to execute any supported application 134 for VM 120. Device driver layers in guest operating system 132 of VM 120 includes device drivers that interact with emulated devices in virtual hardware platform 122 as if such emulated devices were the actual physical devices. Hypervisor 114 is responsible for taking requests from such device drivers and translating the requests into corresponding requests for real device drivers in device driver layer 144 of hypervisor 114. The device drivers in device driver layer 144 then communicate with real devices in hardware platform 102.

It should be recognized that the various terms, layers and categorizations used to describe the virtualization components in FIG. 1 may be referred to differently without departing from their functionality or the spirit or scope of the invention. For example, virtual hardware platform(s) 122 may be considered to be part of virtual machine monitor(s) (VMM) 140 which implement the virtual system support needed to coordinate operations between hypervisor 114 and their respective VMs. Alternatively, virtual hardware platform(s) 122 may also be considered to be separate from VMM(s) 140, and VMM(s) 140 may be considered to be separate from hypervisor 114. One example of hypervisor 114 that may be used is included as a component of VMware's ESX™ product, which is commercially available from VMware, Inc. of Palo Alto, Calif. It should further be recognized that other virtualized computer systems are contemplated, such as hosted virtual machine systems, where the hypervisor is implemented in conjunction with a host operating system.

Gaming device 100 includes a sub-system 103 configured to render handle rendering graphical image for gaming device 100. Sub-system 103 includes a vFX processing unit 105 configured to render one or more graphical images 107 using a combination of the local computing resources (e.g., hardware platform 102) and external cloud resources (e.g., cloud computing resources 113) based on the capacity of the local computing resources. In one implementation, sub-system 103 may be an embedded supplemental hardware (e.g., Linux®-supported) sitting on a top level of the hardware platform of gaming device 100, which would also have direct access to external resources for additional processing, namely, cloud service provider 111.

Cloud service provider 111 is an entity for providing cloud computing resource 113, such as cloud architectures that are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

As used herein, an external or public cloud is a cloud that is provided by an organization that may be separate from a tenant that accesses the external cloud. For example, the tenant may be part of an enterprise, and the external cloud may be part of a cloud service provider that is separate from the enterprise of the tenant and that provides cloud services to different enterprises and/or individuals. In other cases, the provider of the gaming device 100 may be part of the same organization as the cloud service provider 111. In embodiments disclosed herein, a hybrid graphics system is a cloud architecture in which a tenant is provided with seamless access to both local graphics resources and public, external cloud computing resources.

As described in greater detail below, gaming device 100 is configured to dynamically request and instantiate workloads from cloud service provider 111 to use cloud computing resources 113 to generate texture mapping(s) 109 and render other assets to enhance graphics operations of gaming device 100. In some embodiments, cloud computing resources 113 may include one or more virtual machines, similar to those VMs 140 described above, designated for processing graphics tasks as requested gaming device 100. The workload requested by gaming device 100 may dynamically increase or decrease depending on the current workload assigned by a gaming application 134.

FIG. 2 is a flow diagram depicting a method 200 for rendering computer graphics, according to one embodiment of the present disclosure. While method 200 is described in conjunction with the system depicted in FIG. 1, it should be understood that method 200 may be performed by other systems. Method 200 begins at step 202, where gaming application 134 allocates graphical resources comprised of local computing resources of gaming device 100 and external cloud computing resources 113. In some embodiments, gaming application 134 executes a graphics instruction that specifies a graphic and a variable placeholder for enhancing the graphic. Gaming application 134 may allocate graphical resources to support a requested pixel format having a specified bit-depth (e.g., 24-bit, 64-bit, etc.), which includes local device resources plus cloud computing resources.

One example implementation is depicted in pseudo-code below in Table 1. Table 1 includes programming instructions to add dynamic buffers (e.g., "+vfx.add( )") to supplement graphics rendering. Using the instantiated "vfx" object allows dynamic values to be assigned using base level resource allocation in addition to externally provided "injections."

TABLE 1

```
// select format for drawing surface
new PixelFormatDescriptor pfd;
new virtualGraphicsProcessor vfx;
pfd.dwFlags =
        PFD_DRAW_TO_WINDOW |
        PFD_SUPPORT_OPENGL |
        PFD_GENERIC_ACCELERATED |
        PFD_DOUBLEBUFFER;
pdf.pixelType = PFD_TYPE_RGBA;
// 24-bit colors for front/back buffers + variable unit
pfd.setColorBits(24);
vfx.setColorBits(pfd.getColorBits( ) + vfx.add( ));
// 16-bit depth buffer + variable unit
pfd.setDepthBits(16);
vfx.setDepthBits(pfd.getDepthBits( ) + vfx.add( ));
// 8-bit stencil buffer + variable unit
pfd.setStencilBits(8);
vfx.setDepthBits(pfd.getStencilBits( ) + vfx.add( ));
```

At step 202, vFX processing unit 105 determines a capacity of the local computing resources. In some embodiments, vFX processing unit 105 renders the graphical image using a combination of the local computing resources and external cloud resources based on the capacity of the local computing resources. In some embodiments, vFX processing unit 105 determines whether or not the local computing resources (e.g., GPU 112) can support the requested pixel format in its entirety. If so, vFX processing unit 105 may proceed to step 214 and render the entire graphical image using the local computing resources. Otherwise, vFX processing unit 105 may attempt to use cloud computing resources to fulfill the graphics rendering request.

At step 204, vFX processing unit 105 determines availability of the external cloud computing resources 109. In some embodiments, vFX processing unit 105 may render the graphical image using the graphical resources based on the capacity of the local computing resources and on the availability of the external cloud computing resources. For example, responsive to determining that sufficient external cloud computing resources are unavailable, at step 214, vFX processing unit 105 renders the graphical image using the local computing resources and not the external cloud computing resources. Otherwise, responsive to determining that external cloud computing resources are available, vFX processing unit 105 may proceed to step 208.

One example implementation of rendering the graphical image based on the capacity of the local computing resources and availability of cloud computing resources is depicted in pseudo-code below in Table 2. vFX processing unit 105 may continue to operate with available hybrid computing resources using both local and cloud resources (in the case of "vfx.resource>1"). However, if there are connectivity issues with cloud service provider 111 or cloud computing resources 113 become unavailable, vFX processing unit 105 may default to using local resources. vFX processing unit 105 checks external resources (i.e., "vfx.resource") and adjusts the allocation accordingly (i.e., via the setting of the "pixelFormat" variable). The pseudo-code in Table 2 represents a determination ("vfx.resource>1") of the availability of the cloud computing resources 113. If available, the graphics library call ChoosePixelFormat( ) is provided the vfx information as an argument. If not available, the graphics library call ChoosePixelFormat( ) does not use the vfx information as an argument and limits the determination using to only local computing request.

TABLE 2

```
var pixelFormat;
if (vfx.resource > 1) {
    pixelFormat = ChoosePixelFormat(gs_hWindowDC,&pfd,&vfx);
}
elseif (vfx.resource < 1) {
    pixelFormat = ChoosePixelFormat(gs_hWindowDC,&pfd);
}
if ( pixelFormat == 0 ) {
    ReleaseDC(hWnd,gs_hWindowDC);
    return -1;
}
```

In some embodiments, vFX processing unit 105 may set up one or more tiers of computing resources dependent on bandwidth and latency of cloud computing resources 113. One tier of computing resources may be comprised of more cloud computing resources than another (lower) tier of computing resources. If the graphics system comprised of local resources and external resources cannot support the presented pixel formats that have been requested, vFX processing unit 105 attempts to use lesser tiers (with local-only resources being the lowest possible tier).

At step 208, vFX processing unit 105 renders a first portion of the graphical image using the local computing resources. In some embodiments, vFX processing unit 105 renders structural components of the graphical image, including surface geometries, shapes, and other polygons of the graphical image. vFX processing unit 105 may apply one or more texture maps to the surface of a rendered shape or polygon, which can include details, surface texture (e.g., bitmaps, raster images), color details, or light maps (which light the surface of the structural components.)

At step 210, vFX processing unit 105 renders a texture mapping of the graphical image using the external cloud computing resources. In some embodiments, vFX processing unit 105 transmits a request to the external cloud computing resources, and in response, receives the texture mapping of the graphical image from the external cloud computing resources. In some embodiments, vFX processing unit 105 stores the texture mapping in a storage device on the first device. In some embodiments, the texture mapping rendered by the external cloud computing resources 113 may have an enhanced level of detail (including surface details, color depth, resolution) compared to the first portion of the graphical image rendered using the local computing resources (in step 208).

At step 212, vFX processing unit 105 modifies the first portion of the graphical image based on the texture mapping rendered by the external cloud computing resources to increase details in the graphical image, and displays the graphical image using the first device. In some embodiments, vFX processing unit 105 combines the rendered assets obtained from cloud computing resources 113 with the portions of the graphical image rendered by the local computing resources. For example, vFX processing unit 105 may overlay the rendered assets on the portions of the graphical image rendered by the local resources. One example implementation of drawing loops that combines the assets rendered by the local computing resources and the cloud computing resources is depicted in pseudo-code below in Table 3. The provided pseudo-code represents an event-driven loop (sometimes referred to as a message pump). The below block of pseudo code indicates that gaming application 134 uses the graphics library call DrawIt( ) with a vfx information as parameter, and should it lose vFX functionality, the gaming application 134 instructions are to revert to DrawIt( ) calls without the vfx parameter. It should be understood that all of the included pseudo-code in the present application are merely examples and that other architectures and implementations may be used to embody the present invention.

TABLE 3

```
// start the message pump
new Message msg;
while ( TRUE ) {
    if ( PeekMessage(&msg,(HWND)0,0,0,PM_REMOVE) ) {
        if ( msg.message == WM_QUIT )
            break;
        HACCEL hAccel = (HACCEL)0;
        if ( !TranslateAccelerator(hWnd,hAccel,&msg) ) {
            TranslateMessage(&msg);
            DispatchMessage(&msg);
        }
        if (vfx.heartbeat == 0 {
            DrawIt( );
        }
    }
    else {
        // idle loop
        DrawIt(vfx);
    }
}
```

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for rendering computer graphics, the method comprising:
    allocating graphical resources comprised of local computing resources of a first device having a display capability and external cloud computing resources, including executing a graphics instruction that specifies multiple rendering component buffers with a plurality of virtual placeholders for enhancing the graphic using multiple dynamic buffers to inject texture values generated from the external cloud computing resources, wherein each of the dynamic buffers is added to each of the multiple rendering component buffers, wherein the graphical resources are configured to render a graphical image, and wherein the graphical image is associated with a requested pixel format;

determining a capacity of the local computing resources of the first device;
determining that the local computing resources cannot support the requested pixel format in an entirety of the requested pixel format, the determination being based at least in part on the capacity of the local computing resources and the requested pixel format;
determining that the external cloud computing resources are available;
receiving a texture mapping of the graphical image from the external cloud computing resources;
rendering a first portion of the graphical image using the local computing resources, the local computing resources comprising a graphics processing unit (GPU) of the graphical resources of the local computing resources;
rendering the texture mapping of the graphical image using the external cloud computing resources, wherein the external cloud computing resources are accessible to the local computing resources over a network;
modifying the first portion of the graphical image based on the texture mapping rendered by the external cloud computing resources to increase details in the graphical image;
storing the texture mapping in a storage device on the first device;
determining that a connection to the external cloud computing resources is lost;
continuing to render the graphical image using the texture mapping stored in the storage device without abruptly stopping;
determining that the texture mapping stored in the storage device is no longer usable;
continuing to render the graphical image using the local computing resources without abruptly stopping such that graphics generated is downgraded until the connection to the external cloud computing resources is re-established; and
displaying the graphical image at the first device.

2. The method of claim 1, wherein determining that the external cloud computing resources are available comprises a determination that there are no connectivity issues with the external cloud computing resources.

3. The method of claim 1, wherein determining that the external cloud computing resources are available comprises a determination dependent on a bandwidth of the external cloud computing resources.

4. The method of claim 1, wherein determining that the external cloud computing resources are available comprises a determination dependent on a latency of the external cloud computing resources.

5. The method of claim 1, wherein the multiple dynamic buffers include a dynamic buffer for color data that is added to a predefined bit color data buffer, a dynamic buffer for depth data that is added to a predefined bit depth data buffer and a dynamic buffer for stencil data that is added to a predefined bit stencil data buffer.

6. The method of claim 1, wherein the requested pixel format comprises a 24-bit pixel format.

7. The method of claim 1, wherein the requested pixel format comprises a 64-bit pixel format.

8. A system comprising:
local computing resources comprising at least one processor and a graphics processing unit, wherein the processor is configured to:
allocate graphical resources comprised of the local computing resources of a first device having a display capability and external cloud computing resources and execute a graphics instruction that specifies multiple rendering component buffers with a plurality of virtual placeholders for enhancing the graphic using multiple dynamic buffers to inject texture values generated from the external cloud computing resources, wherein each of the dynamic buffers is added to each of the multiple rendering component buffers, wherein the graphical resources are configured to render a graphical image, and wherein the graphical image is associated with a requested pixel format;
determine a capacity of the local computing resources of the first device;
determine that the local computing resources cannot support the requested pixel format in an entirety of the requested pixel format, the determination being based at least in part on the capacity of the local computing resources and the requested pixel format;
determine that the external cloud computing resources are available;
receive a texture mapping of the graphical image from the external cloud computing resources;
render a first portion of the graphical image using the local computing resources, the local computing resources comprising a graphics processing unit (GPU) of the graphical resources of the local computing resources;
render the texture mapping of the graphical image using the external cloud computing resources, wherein the external cloud computing resources are accessible to the local computing resources over a network;
modify the first portion of the graphical image based on the texture mapping rendered by the external cloud computing resources to increase details in the graphical image;
store the texture mapping in a storage device on the first device;
determine that a connection to the external cloud computing resources is lost;
continue to render the graphical image using the texture mapping stored in the storage device without abruptly stopping;
determine that the texture mapping stored in the storage device is no longer usable;
continue to render the graphical image using the local computing resources without abruptly stopping such that graphics generated is downgraded until the connection to the external cloud computing resources is re-established; and
display the graphical image at the first device.

9. The system of claim 8, wherein determining that the external cloud computing resources are available comprises a determination that there are no connectivity issues with the external cloud computing resources.

10. The system of claim 8, wherein determining that the external cloud computing resources are available comprises a determination dependent on a bandwidth of the external cloud computing resources.

11. The system of claim 8, wherein determining that the external cloud computing resources are available comprises a determination dependent on a latency of the external cloud computing resources.

12. The system of claim 8, wherein the multiple dynamic buffers include a dynamic buffer for color data that is added to a predefined bit color data buffer, a dynamic buffer for depth data that is added to a predefined bit depth data buffer and a dynamic buffer for stencil data that is added to a predefined bit stencil data buffer.

13. A non-transitory computer readable medium comprising instructions that, when executed by a processor, performs an operation comprising:
- allocating graphical resources comprised of local computing resources of a first device having a display capability and external cloud computing resources, including executing multiple rendering component buffers with a plurality of virtual placeholders for enhancing the graphic using multiple dynamic buffers to inject texture values generated from the external cloud computing resources, wherein each of the dynamic buffers is added to each of the multiple rendering component buffers, wherein the graphical resources are configured to render a graphical image, and wherein the graphical image is associated with a requested pixel format;
- determining a capacity of the local computing resources of the first device;
- determining that the local computing resources cannot support the requested pixel format in an entirety of the requested pixel format, the determination being based at least in part on the capacity of the local computing resources and the requested pixel format;
- determining that the external cloud computing resources are available;
- receiving a texture mapping of the graphical image from the external cloud computing resources;
- rendering a first portion of the graphical image using the local computing resources, the local computing resources comprising a graphics processing unit (GPU) of the graphical resources of the local computing resources;
- rendering the texture mapping of the graphical image using the external cloud computing resources, wherein the external cloud computing resources are accessible to the local computing resources over a network;
- modifying the first portion of the graphical image based on the texture mapping rendered by the external cloud computing resources to increase details in the graphical image;
- storing the texture mapping in a storage device on the first device;
- determining that a connection to the external cloud computing resources is lost;
- continuing to render the graphical image using the texture mapping stored in the storage device without abruptly stopping;
- determining that the texture mapping stored in the storage device is no longer usable;
- continuing to render the graphical image using the local computing resources without abruptly stopping such that graphics generated is downgraded until the connection to the external cloud computing resources is re-established; and
- displaying the graphical image at the first device.

14. The computer readable medium of claim 13, wherein determining that the external cloud computing resources are available comprises a determination that there are no connectivity issues with the external cloud computing resources.

15. The computer readable medium of claim 13, wherein determining that the external cloud computing resources are available comprises a determination dependent on a bandwidth of the external cloud computing resources.

16. The computer readable medium of claim 15, wherein determining that the external cloud resources are available comprises a determination dependent on a latency of the external cloud computing resources.

17. The computer readable medium of claim 13, wherein the multiple dynamic buffers include a dynamic buffer for color data that is added to a predefined bit color data buffer, a dynamic buffer for depth data that is added to a predefined bit depth data buffer and a dynamic buffer for stencil data that is added to a predefined bit stencil data buffer.

* * * * *